United States Patent
Kang et al.

(10) Patent No.: US 7,611,568 B2
(45) Date of Patent: Nov. 3, 2009

(54) LIQUID-GAS SEPARATOR FOR DIRECT LIQUID FEED FUEL CELL

(75) Inventors: Sang-kyun Kang, Seoul (KR); Dong-kee Sohn, Seoul (KR); Woong-ho Cho, Seongnam-si (KR); Sang-hyeon Choi, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 557 days.

(21) Appl. No.: 11/445,234

(22) Filed: Jun. 2, 2006

(65) Prior Publication Data

US 2007/0180992 A1 Aug. 9, 2007

(30) Foreign Application Priority Data

Feb. 7, 2006 (KR) ................. 10-2006-0011834

(51) Int. Cl.
*B01D 53/22* (2006.01)
(52) U.S. Cl. .............. 96/4; 96/6; 96/7; 96/11; 96/13; 96/14; 96/155; 95/45; 95/46; 95/52; 95/241; 210/321.6; 210/321.64; 210/321.84; 210/436; 210/640; 429/19; 429/34; 55/478; 55/481
(58) Field of Classification Search ............... 96/4, 96/6, 7, 11, 13, 14, 155; 95/45, 46, 52, 241; 210/321.6, 321.64, 321.84, 436, 640, 641; 429/19, 34; 55/478, 481
See application file for complete search history.

(56) References Cited

U.S. PATENT DOCUMENTS

| 4,399,235 | A | * | 8/1983 | Raley et al. | 521/31 |
| 4,525,182 | A | * | 6/1985 | Rising et al. | 96/6 |
| 5,827,429 | A | * | 10/1998 | Ruschke et al. | 96/6 |
| 5,989,318 | A | * | 11/1999 | Schroll | 96/6 |
| 6,579,457 | B1 | * | 6/2003 | Ehrnsperger et al. | 96/6 |
| 6,942,718 | B1 | * | 9/2005 | Schmidt | 95/46 |

(Continued)

FOREIGN PATENT DOCUMENTS

| WO | WO 2005/029625 | 3/2005 |
| WO | WO 2005/057704 | 6/2005 |

OTHER PUBLICATIONS

Office Action issued by the Chinese Patent Office in Chinese Patent Application No. 2006101212385 on Apr. 4, 2008.
Certificate of Patent issued by the Chinese Patent Office in Chinese Patent Application No. 200610121238.5.

*Primary Examiner*—Jason M Greene
(74) *Attorney, Agent, or Firm*—Stein McEwen, LLP (57) ABSTRACT

A liquid-gas separator for a direct liquid feed fuel cell includes: a housing having an open hole; a gas extracting membrane that covers the open hole and transmits only the gas; a liquid extracting member that defines a first chamber that contacts the gas extracting membrane and a second chamber that does not contact the gas extracting membrane, and selectively transmits the liquid in the first chamber to the second chamber; an inlet that guides the liquid and the gas into the housing; and an outlet that is connected to the second chamber and guides the liquid in the second chamber to the outside.

18 Claims, 5 Drawing Sheets

U.S. PATENT DOCUMENTS

| | | | |
|---|---|---|---|
| 6,989,002 B2 * | 1/2006 | Guala | 604/126 |
| 7,141,097 B2 * | 11/2006 | Leahey | 96/6 |
| 7,238,224 B2 * | 7/2007 | Kent | 95/46 |
| 7,449,051 B2 * | 11/2008 | Olsen | 96/6 |
| 2002/0192525 A1 * | 12/2002 | Neutzler | 429/34 |
| 2005/0058862 A1 | 3/2005 | Sone et al. | |

* cited by examiner

LIQUID-GAS SEPARATOR FOR DIRECT LIQUID FEED FUEL CELL

CROSS-REFERENCE TO RELATED APPLICATION

This application claims the benefit of Korean Patent Application No. 2006-11834, filed on Feb. 7, 2006, in the Korean Intellectual Property Office, the disclosure of which is incorporated herein in its entirety by reference.

BACKGROUND OF THE INVENTION

1. Field of the Invention

Aspects of the present invention relate to a liquid-gas separator for separating carbon dioxide from an unreacted liquid fuel discharged from an anode electrode of a direct liquid feed fuel cell.

2. Description of the Related Art

A direct liquid feed fuel cell is an apparatus that generates electricity through an electrochemical reaction between an organic fuel, such as methanol or ethanol, and an oxidant, i.e., oxygen. The electricity generated by a direct liquid feed fuel cell has a high energy density and a high current density. Also, since a liquid fuel, e.g., methanol, is fed directly to a direct liquid feed fuel cell, the direct liquid feed fuel cell does not require a peripheral device, such as a fuel reformer, and the liquid fuel is stored and supplied easily.

Figure 1:
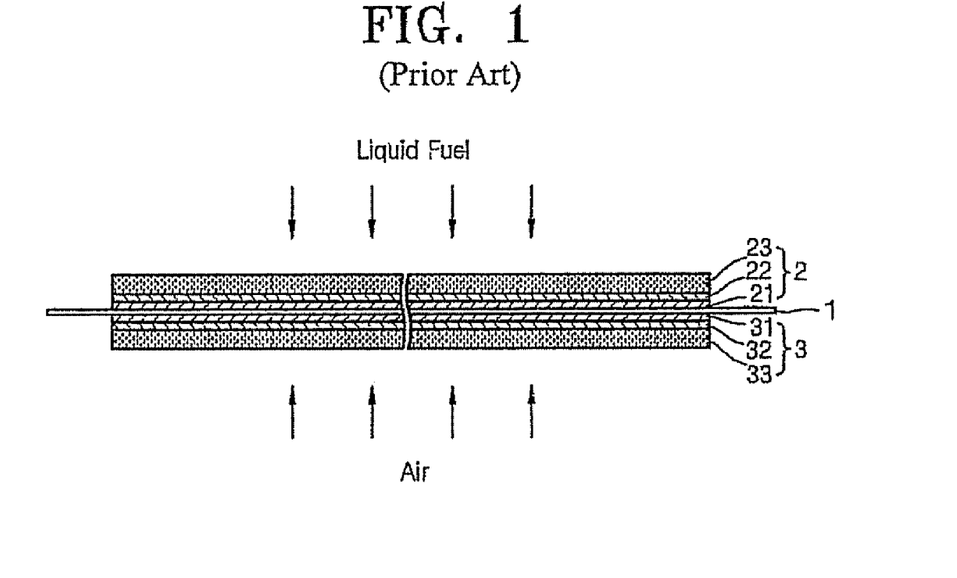
FIG. 1 is a cross-sectional view of a basic configuration of a direct liquid feed fuel cell.

FIG. 1 is a cross-sectional view of a direct liquid feed fuel cell. Referring to FIG. 1, the direct feed fuel cell has a structure in which an electrolyte membrane 1 is interposed between an anode electrode 2 and a cathode electrode 3. The anode electrode 2 includes a diffusion layer 22 for supplying and diffusing a fuel, a catalyst layer 21 where an oxidation reaction of the fuel occurs, and an electrode supporting layer 23. The cathode electrode 3 also includes a diffusion layer 32 for supplying and diffusing the oxidant, a catalyst layer 31 where a reduction reaction occurs, and an electrode supporting layer 33. The catalyst layers 21 and 31 may each include a noble metal having superior catalytic characteristics at low temperatures, such as platinum. To avoid catalyst poisoning by CO, which is a by-product of the electrode reactions, a catalyst formed of an alloy of a transition metal, such as ruthenium, rhodium, osmium, or nickel, can be used. The electrode supporting layers 23 and 33 can be made of waterproof carbon paper or waterproof carbon fiber to easily supply fuel and discharge reaction products. The electrolyte membrane 1 is a hydrogen ion exchange membrane that has ion conductivity and can contain moisture. For example, the electrolyte membrane 1 may be a polymer membrane having a thickness of 50-200 μm.

An electrode reaction of a direct methanol fuel cell (DMFC), which is a type of direct liquid feed fuel cell, includes an anode reaction where fuel is oxidized and a cathode reaction where hydrogen and oxygen are reduced, as described below.

[Reaction 1]

$CH_3OH+H_2O \rightarrow CO_2+6H^++6e^-$ (Anode reaction)

[Reaction 2]

$3/2\ O_2+6H^++6e^- \rightarrow 3H_2O$ (Cathode reaction)

[Reaction 3]

$CH_3OH+3/2\ O_2 \rightarrow 2H_2O+CO_2$ (Overall reaction)

Carbon dioxide, hydrogen ions, and electrons are produced at the anode electrode 2 where the fuel is oxidized (reaction 1). The hydrogen ions migrate to the cathode electrode 3 through the electrolyte membrane 1. Water is produced by the reduction reaction between the hydrogen ions, electrons transferred from an external circuit, and oxygen at the cathode electrode 3 (reaction 2). Accordingly, water and carbon dioxide are produced as the result of the overall electrochemical reaction (reaction 3) between methanol and oxygen. Two moles of water are produced when one mole of methanol reacts with oxygen.

The liquid fuel used in the fuel cell may be a mixture of pure methanol and water produced in the system or already stored in the fuel cell. When a fuel of high concentration is used, the performance of the fuel cell is greatly reduced due to crossover of the fuel at the electrolyte membrane (the hydrogen ion exchange membrane). Therefore, methanol is typically diluted to a low concentration, such as 0.5 to 2 M (2 to 8 volume %).

Figure 2A:
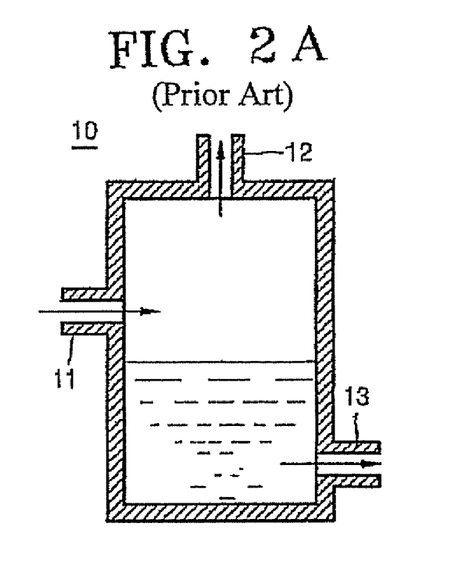
FIGS. 2A and 2B are schematic cross-sectional views of a conventional liquid-gas separator used for a fuel cell.
Figure 2B:
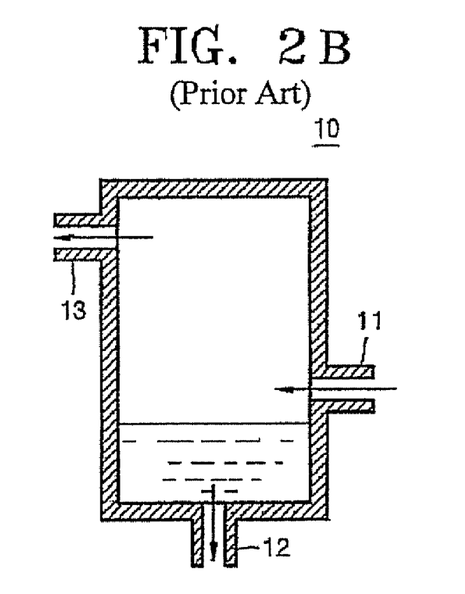

FIGS. 2A and 2B are a cross-sectional schematic views of a conventional liquid-gas separator 10 used in fuel cells. When the liquid-gas separator 10 is at a normal position (refer to FIG. 2A), unreacted fuel and carbon dioxide enter the liquid-gas separator through an inlet 11. Carbon dioxide is exhausted from a hole 12 formed on a ceiling of the liquid-gas separator body, and the unreacted fuel is recovered to the fuel cell through an outlet 13 formed at a lower part of the liquid-gas separator body.

However, FIGS. 2A and 2B illustrate why a conventional liquid-gas separator 10, which may be suitable for a stationary fuel cell, is disadvantageous for a mobile fuel cell. Specifically, when used in a mobile fuel cell, the liquid-gas separator 10 is not fixed in one position and may become inverted. When the liquid-gas separator 10 is inverted (refer to FIG. 2B), carbon dioxide may enter the anode electrode through the outlet 13 and the unreacted fuel can be discharged to the outside through the hole 12.

Also, the liquid fuel that enters the inlet 11 of the liquid-gas separator 10 may include bits of catalyst, metal particles, and metal ions, such as, for example, Fe ions. The catalyst and metal particles can cause a malfunction of a pump (not shown) connected to the liquid gas separator 10, and the metal ions can contaminate the fuel stack.

SUMMARY OF THE INVENTION

Aspects of the present invention provide a liquid-gas separator for a direct liquid feed fuel cell that performs liquid-gas separation and impurity filtering.

According to an aspect of the present invention, there is provided a liquid-gas separator of a direct liquid feed fuel cell, which receives liquid and gas from the direct liquid feed fuel cell and separates the liquid and gas, comprising: a housing having an open hole; a gas extracting membrane that covers the open hole and transmits only the gas; a liquid extracting member that divides an interior of the housing into a first chamber that contacts the gas extracting membrane and a second chamber that does not contact the gas extracting membrane, and selectively transmits the liquid in the first chamber to the second chamber; an inlet that guides the liquid and the gas into the first chamber; and an outlet that is connected to the second chamber and guides the liquid in the second chamber to the outside.

According to an aspect of the present invention, the liquid extracting membrane may have pores with diameters of 50 μm or less.

According to an aspect of the present invention, the liquid-gas separator may further comprise, in the second chamber, a first member having larger pores than the pores of the liquid extracting membrane.

According to an aspect of the present invention, the second chamber may be filled with ion exchange beads having diameters of 0.1 to 1 mm.

According to an aspect of the present invention, the gas extracting membrane may comprise polytetrafluoro ethylene (PTFE).

The gas extracting membrane may be formed by pressing the PTFE with a porous reinforcing member.

According to an aspect of the present invention, the liquid extracting membrane may be installed substantially parallel to the gas extracting membrane.

According to another aspect of the present invention, there is provided a liquid-gas separator of a direct liquid feed fuel cell, which receives liquid and gas from the direct liquid feed fuel cell and separates the liquid and gas, the liquid-gas separator comprising: a housing with open portion on the outer circumference thereof; a gas extracting membrane that covers the open portion and transmits only the gas; a liquid extracting member that defines a first chamber that is connected to the gas extracting membrane and a second chamber that is not connected to the gas extracting membrane, and selectively transmits the liquid in the first chamber to the second chamber; an inlet that guides the liquid and the gas into the first chamber; and an outlet that is connected to the second chamber and guides the liquid in the second chamber to the outside.

According to an aspect of the present invention, the second chamber may be formed inside the first chamber.

According to another aspect of the present invention, there is provided a liquid-gas separator of a direct liquid feed fuel cell which receives liquid and gas from the direct liquid feed fuel cell and separates the liquid and gas, the liquid-gas separator comprising: a housing having one or more open portions on an outer boundary thereof, one or more gas extracting membranes, wherein each of the one or more open portions is covered by one of the one or more gas extracting membranes and wherein the one or more gas extracting membranes allow only gas to pass through from an interior of the housing to an exterior of the housing; a liquid extracting member that divides the interior of the housing into a first chamber that has a least one boundary that includes at least one of the one or more open portions covered by one of the one or more gas extracting membranes and a second chamber that does not have at least one boundary containing at least one of the one or more open portions covered by one of the one or more gas extracting membranes, and wherein the liquid extracting member selectively transmits the liquid in the first chamber to the second chamber; an inlet that guides the liquid and the gas into the first chamber; and an outlet that is connected to the second chamber and guides the liquid in the second chamber to the outside.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
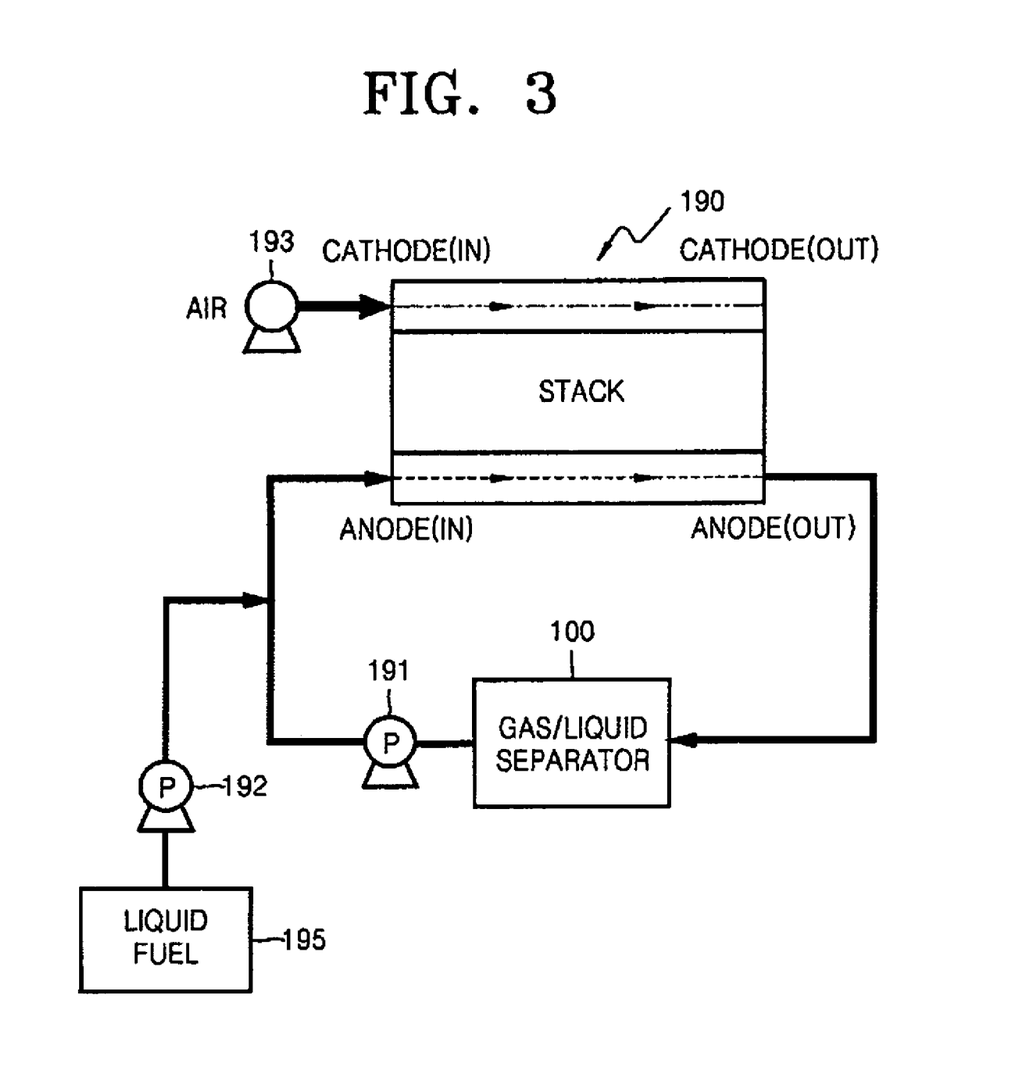
FIG. 3 is a schematic diagram of a direct liquid feed fuel cell system having a liquid-gas separator according to an embodiment of the present invention.

FIG. 3 is a schematic diagram of a direct liquid feed fuel cell system having a liquid-gas separator according to an embodiment of the present invention.

Referring to FIG. 3, the direct liquid feed fuel cell system includes a direct liquid feed fuel cell, such as a fuel cell stack 190, a liquid-gas separator 100 that exhausts carbon dioxide into the atmosphere and delivers liquid fuel to an anode via a water pump 191 after receiving diluted unreacted liquid fuel and carbon dioxide produced by an electrochemical reaction, a fuel pump 192 that conveys the diluted unreacted liquid fuel (e.g., methanol) from a fuel tank 195 to the fuel cell stack 190, and a blower 193 that supplies air to the fuel cell stack 190. Water produced at a cathode electrode is discharged to the outside or can be circulated to the liquid-gas separator 100 or the fuel tank 195.

Figure 4:
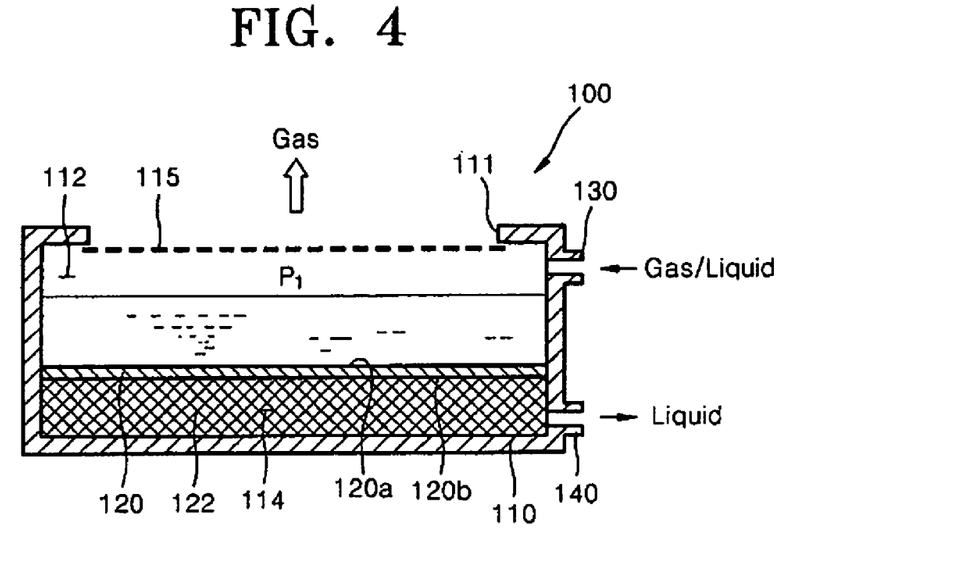
FIG. 4 is a cross-sectional view of a liquid-gas separator according to an embodiment of the present invention.

FIG. 4 is a cross-sectional view of the liquid-gas separator 100 according to an embodiment of the present invention.

Referring to FIG. 4, the liquid-gas separator 100 includes a housing 110 having an open hole 111. The housing 110 is formed of walls though which a gas or liquid cannot pass. For example, the housing 110 can be formed of a metal, a plastic material, or a flexible vinyl. A gas extracting membrane 115 is formed on the open hole 111. A liquid extracting membrane 120 is formed in the housing 110, parallel to the gas extracting membrane 115. The liquid extracting membrane 120 divides an inner space of the housing 110 into a first chamber 112 and a second chamber 114.

The housing 110 of the first chamber 112 includes an inlet 130 that guides a liquid fuel and carbon dioxide into the first chamber 112 from an external source, such as, for example, an anode electrode of the fuel cell stack 190. The housing 110 of the second chamber 114 includes an outlet 140 to transport unreacted fuel in the second chamber 114 to the anode electrode of the fuel cell stack 190 (see FIG. 3) (the water pump 191 in FIG. 3 can be used in this regard).

The second chamber 114 can be filled with a hydrophilic member 122.

The liquid extracting membrane 120 can be a hydrophilic foam member having pores with diameters of 50 μm or less. The liquid extracting membrane 120 filters out catalyst and metal particles from the liquid fuel in the first chamber 112, and discharges the liquid fuel to the second chamber 114.

The hydrophilic member 122 can be a hydrophilic foam member having larger pores than the liquid extracting membrane 120, for example, pores with diameters of 100 μm to 1 mm. The hydrophilic member 122 facilitates the transmittance of the liquid fuel from the liquid extracting membrane 120. The second chamber 114 may be filled with the hydrophilic member 122 or can be filled with ion exchange beads (not shown). The ion exchange beads may have diameters of 100 to 1000 μm, and can filter out cations that have passed through the liquid extracting membrane 120 together with the liquid fuel.

The gas extracting membrane 115 can be formed of a porous and hydrophobic material such as, for example, polytetrafluoro ethylene (PTFE). The gas extracting membrane 115 may be shaped by pressing the PTFE with a porous reinforcing member (not shown), such as a porous cloth. The gas extracting membrane 115 blocks the outflow of the liquid fuel from the first chamber 112 and allows the exhaustion of a gas, e.g., carbon dioxide.

Figure 5:
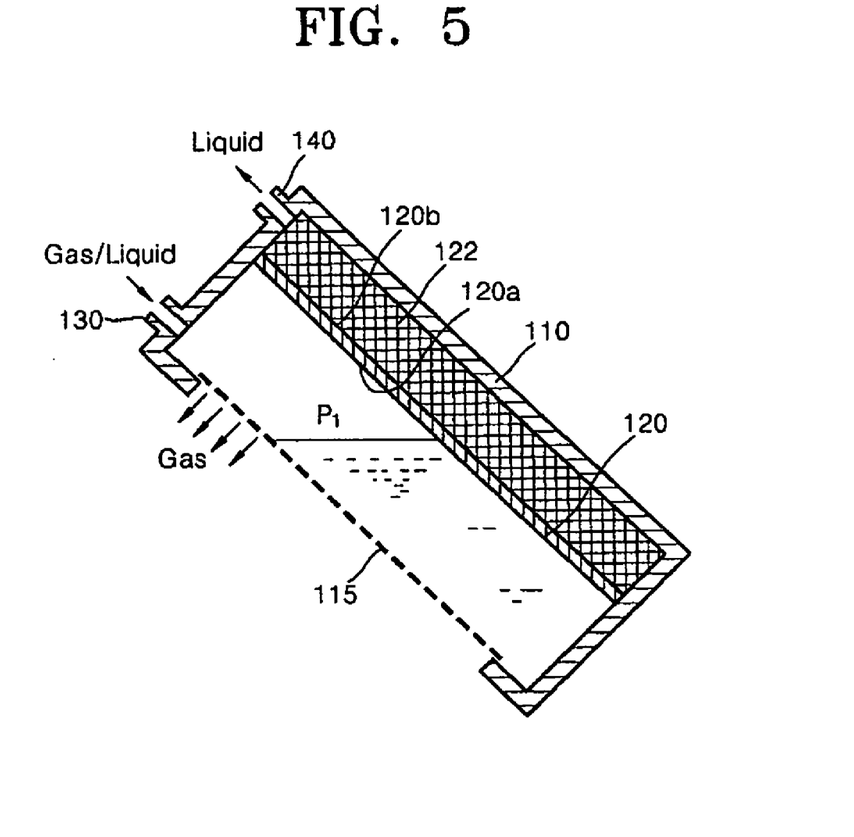
FIG. 5 is a cross-sectional view of the liquid-gas separator of FIG. 4 at a different orientation.

FIG. 5 is a cross-sectional view of the liquid-gas separator of FIG. 4 at a different orientation.

The liquid extracting membrane 120 includes a first surface 120a that faces the liquid fuel in the first chamber 112 and a second surface 120b that contacts the hydrophilic member 122. When a portion of the liquid extracting membrane 120 contacts the liquid in the first chamber 112, the liquid extracting membrane 120 gets fully wetted by the capillary force. In order for gas in the first chamber 112, to be able to penetrate into the liquid extracting membrane 120 through the region of the first surface 120a that does not contact the liquid fuel, the gas pressure $P_1$ in the first chamber 112 must overcome a first capillary force at the first surface 120a of the liquid extracting membrane 120, and in order to enter the hydrophilic member 122 from the liquid extracting membrane 120, the gas pressure $P_1$ must overcome a secondary capillary force at the second surface 120b Since the first capillary force is not generated at a region of the first surface 120a that contacts the liquid fuel, the liquid fuel can move to the hydrophilic member 122 through the liquid extracting membrane 120. The hydrophilic member 122 easily discharges the liquid fuel from the liquid extracting membrane 120 to the second chamber 114.

The gas in the housing 110 is exhausted to the atmosphere through the gas extracting membrane 115 by the gas pressure $P_1$ of the housing 110.

As described above, the liquid-gas separator 100 according to the present embodiment can separate gas and liquid except when the liquid fuel in the first chamber 112 completely covers the gas extracting membrane 115 or when the liquid fuel does not contact the liquid extracting membrane 120 at all.

Figure 6:
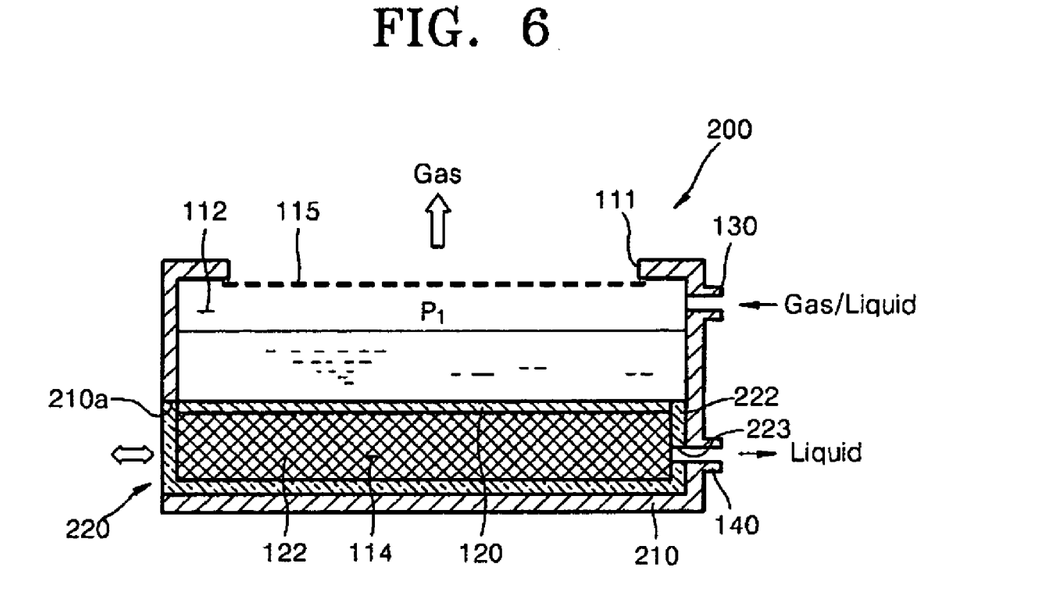
FIG. 6 is a cross-sectional view of a liquid-gas separator according to another embodiment of the present invention.

FIG. 6 is a cross-sectional view of a liquid-gas separator 200 according to another embodiment of the present invention. The same reference numerals in FIGS. 4 and 6 are used to indicate substantially identical elements, and thus the detailed descriptions thereof will not be repeated.

Referring to FIG. 6, a housing 210 of the liquid-gas separator 200 includes an entrance 210a for inserting a cartridge 220. The cartridge 220 includes a main body consisting of a bottom surface and walls 222. One of the walls 222 includes a hole 223 corresponding to the outlet 140. Liquid fuel discharged from the second chamber 114 is supplied to the anode electrode through the hole 223 and the outlet 140.

The cartridge 220 is a removable cartridge, and can be replaced with a new cartridge when the liquid extracting membrane 120 and the hydrophilic member 122 are damaged or contaminated. The replacement of the cartridge 220 may be performed by orienting the liquid-gas separator 200 so that the gas extracting membrane 115 is in a downward position. That is, to minimize spilling of liquid fuel that may be remaining in the liquid-gas separator when the cartridge is replaced, the liquid-gas separator may be oriented so that the gas extracting membrane is in a bottom position and so that the second chamber 114 is above the first chamber 112.

The operation of the liquid-gas separator 200 according to the present embodiment is substantially the same as the liquid-gas separator 100 of the previous embodiment, and thus the description thereof will not be repeated.

Figure 7:
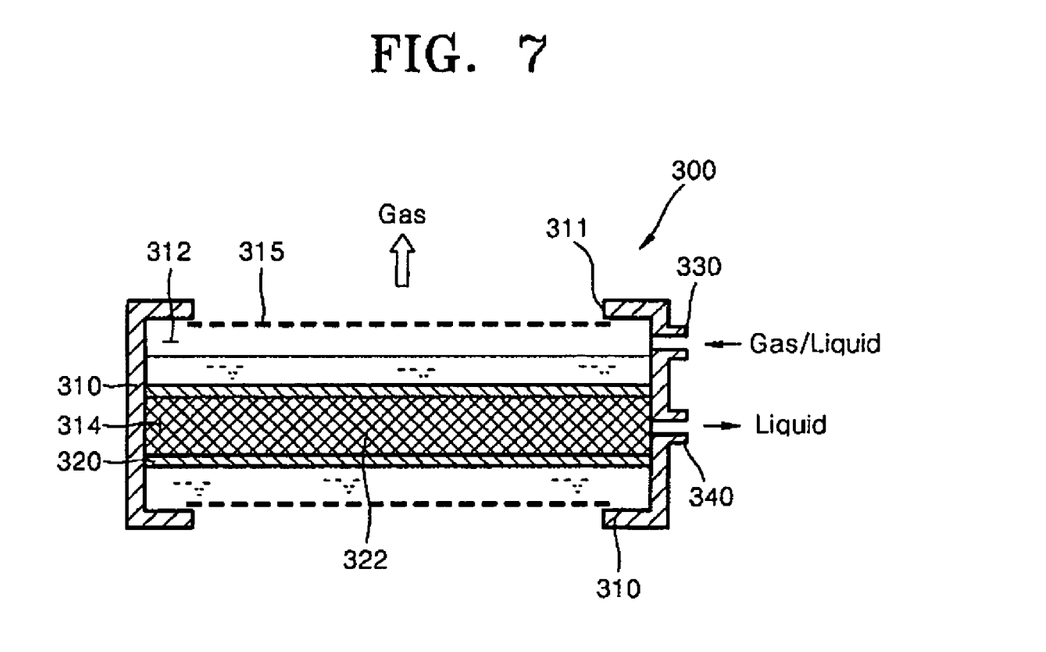
FIG. 7 is a cross-sectional view of a liquid-gas separator according to still another embodiment of the present invention.

FIG. 7 is a cross-sectional view of a liquid-gas separator 300 according to still another embodiment of the present invention.

Referring to FIG. 7, the liquid-gas separator 300 includes a housing 310 having open holes 311 on surfaces thereof. The housing 310 is formed of walls that are impenetrable by gas and liquid. For example, the housing 310 may be formed of a metal, a plastic material, or a flexible vinyl. Gas extracting membranes 315 are formed on the open holes 311. Liquid extracting membranes 320 are formed in a central portion of the housing 310 parallel to the gas extraction membrane 315. The liquid extracting membranes 320 divide an inner space of the housing 310 into first chamber 312, which are outer spaces of the housing 310, and a second chamber 314, which is a central space of the housing 310. The first chamber 312 is connected to the gas extraction membranes 315, but the second chamber 314 is not connected to the gas extraction membranes 315. The second chamber 314 is formed inside of the first chamber 312. In other words, the second chamber 314 may be formed so that except for end portions, the second chamber 314 is completely surrounded by the first chamber 312.

The housing 310 of the first chamber 312 includes an inlet 330 that guides liquid fuel and carbon dioxide into the first chamber 312 from an external source, such as, for example, an anode electrode of the fuel cell stack. The housing 310 of the second chamber 314 includes an outlet 140 to transport unreacted fuel in the second chamber 314 to the anode electrode of the fuel cell stack 190 (see FIG. 3) (the water pump 191 in FIG. 3 can be used for this purpose).

The second chamber 314 can be filled with a hydrophilic member 322.

The liquid extracting membrane 320 can be a hydrophilic foam member having pores with diameters of 50 μm or less. The liquid extracting membrane 320 filters out catalyst or metal particles from the liquid fuel that enters the first chamber 312, and discharges the liquid fuel to the second chamber 314.

The hydrophilic member 322 can be a hydrophilic foam member having larger pores than the liquid extracting membrane 320, such as, for example, pores with diameters of 100 μm to 1 mm. The hydrophilic member 322 facilitates the transmittance of the liquid fuel from the first chamber 312 to the second chamber 314. The second chamber 314 may be filled with the hydrophilic member 322 or may be filled with ion exchange beads (not shown). The ion exchange beads may have a diameter of 100 to 1000 μm, and can filter out cations that have passed through the liquid extracting membrane 320 together with the liquid fuel.

The liquid-gas separator 300 according to the present embodiment can separate a gas and a liquid when the liquid fuel that enters through the inlet 330 contacts the liquid extracting membrane 320. The operation of the liquid-gas separator 300 according to the present embodiment is substantially the same as that of the liquid-gas separator 100 of the previous embodiment, and thus the description thereof will not be repeated.

Figure 8:
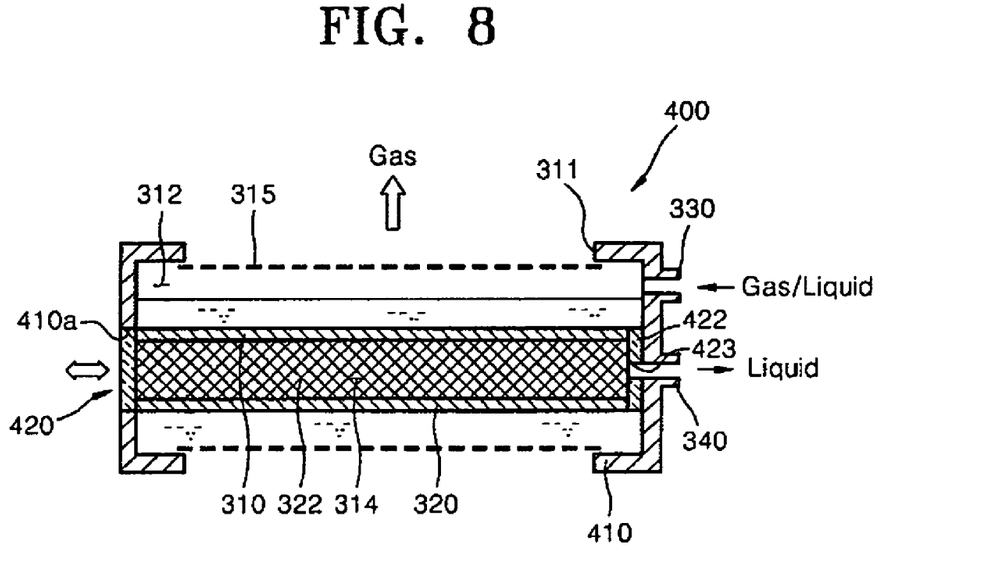
FIG. 8 is a cross-sectional view of a liquid-gas separator according to yet another embodiment of the present invention.

FIG. 8 is a cross-sectional view of a liquid-gas separator 400 according to another embodiment of the present invention. The same reference numerals in FIGS. 7 and 8 are used to indicate substantially identical elements, and thus the detailed descriptions thereof will not be repeated.

Referring to FIG. 8, a housing 410 of the liquid-gas separator 400 includes an entrance 410*a* for inserting a cartridge 420. A wall 422 of the cartridge 420 includes a hole 423 corresponding to the outlet 340. Liquid fuel discharged from the second chamber 314 is supplied to the anode electrode through the hole 423 and the outlet 340.

The cartridge 420 can be replaced with a new cartridge through the entrance 410*a* when the liquid extracting membrane 320 and the hydrophilic member 322 are damaged or contaminated.

As described above, the liquid-gas separator according to an aspect of the present invention separates a liquid and a gas without substantial limitations to the orientation of the liquid-gas separator when the liquid-gas separator is applied to a mobile direct liquid feed fuel cell. Also, the liquid-gas separator can prevent the malfunction of pumps caused by particles or mitigate the degradation of fuel cell stack caused by cations that enter from an external source since the liquid-gas separator can filter the particles or cations. Accordingly, a direct liquid feed fuel cell having the liquid-gas separator performs the liquid-gas separation function regardless of the orientation of the liquid-gas separator.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid-gas separator of a direct liquid feed fuel cell which receives liquid and gas from the direct liquid feed fuel cell and separates the liquid and gas, the liquid-gas separator comprising:
    a housing having an open hole;
    a gas extracting membrane that covers the open hole and transmits only the gas;
    a liquid extracting membrane that divides an interior of the housing into a first chamber that contacts the gas extracting membrane and a second chamber that does not contact the gas extracting membrane, and selectively transmits the liquid in the first chamber to the second chamber, wherein the liquid extracting membrane and the second chamber are incorporated in a removable cartridge and wherein the housing comprises an entrance into which the removable cartridge is inserted;
    an inlet that guides the liquid and the gas into the first chamber; and
    an outlet that is connected to the second chamber and guides the liquid in the second chamber to the outside.

2. The liquid-gas separator of claim 1, wherein the liquid extracting membrane has pores with diameters of 50 μm or less.

3. The liquid-gas separator of claim 1, wherein the liquid extracting membrane comprises a hydrophilic foam.

4. The liquid-gas separator of claim 2, further comprising, in the second chamber, a hydrophilic member having larger pores than the pores of the liquid extracting membrane.

5. The liquid-gas separator of claim 4, wherein the hydrophilic member comprises hydrophilic foam having pores with diameters from 100 μm to 1 mm.

6. The liquid-gas separator of claim 2, wherein the second chamber is filled with ion exchange beads having diameters of 0.1 to 1 mm.

7. The liquid-gas separator of claim 1, wherein the gas extracting membrane comprises polytetrafluoro ethylene (PTFE).

8. The liquid-gas separator of claim 5, wherein the gas extracting membrane is formed by pressing the PTFE with a porous reinforcing member.

9. The liquid-gas separator of claim 1, wherein the liquid extracting membrane is installed substantially parallel to the gas extracting membrane.

10. A liquid-gas separator of a direct liquid feed fuel cell which receives liquid and gas from the direct liquid feed fuel cell and separates the liquid and gas, the liquid-gas separator comprising:
    a housing having open portion on the outer circumference thereof;
    a gas extracting membrane that covers the open portion and transmits only the gas;
    a liquid extracting membrane that defines a first chamber that is connected to the gas extracting membrane and a second chamber that is not connected to the gas extracting membrane, and selectively transmits the liquid in the first chamber to the second chamber, wherein the liquid extracting membrane and the first chamber surround the second chamber;
    an inlet that guides the liquid and the gas into the first chamber; and
    an outlet that is connected to the second chamber and guides the liquid in the second chamber to the outside.

11. The liquid-gas separator of claim 10, further comprising a removable cartridge that comprises:
    the liquid extracting membrane; and
    the second chamber;
    wherein the housing comprises an entrance into which the cartridge is inserted.

12. The liquid-gas separator of claim 10, wherein the liquid extracting membrane has pores with diameters of 50 μm or less.

13. The liquid-gas separator of claim 10, further comprising, in the second chamber, a first member having larger pores than the pores of the liquid extracting membrane.

14. The liquid-gas separator of claim 10, wherein the second chamber is filled with ion exchange beads having diameters of 0.1 to 1 mm.

15. The liquid-gas separator of claim 10, wherein the gas extracting membrane comprises polytetrafluoro ethylene (PTFE).

16. The liquid-gas separator of claim 15, wherein the gas extracting membrane is formed by pressing the PTFE with a porous reinforcing member.

17. A liquid-gas separator of a direct liquid feed fuel cell which receives liquid and gas from the direct liquid feed fuel cell and separates the liquid and gas, the liquid-gas separator comprising:
    a housing having one or more open portions on an outer boundary thereof;
    one or more gas extracting membranes, wherein each of the one or more open portions is covered by one of the one or more gas extracting membranes and wherein the one or more gas extracting membranes allow only gas to pass through from an interior of the housing to an exterior of the housing;

a liquid extracting member that divides the interior of the housing into a first chamber that has a least one boundary that includes at least one of the one or more open portions covered by one of the one or more gas extracting membranes and a second chamber that does not have at least one boundary containing at least one of the one or more open portions covered by one of the one or more gas extracting membranes, and wherein the liquid extracting member selectively transmits the liquid in the first chamber to the second chamber and wherein the second chamber includes ion exchange beads;

an inlet that guides the liquid and the gas into the first chamber; and an outlet that is connected to the second chamber and guides the liquid in the second chamber to the outside.

18. The liquid-gas separator of claim 17, wherein the open portions on the outer boundary of the housing are positioned such that the liquid-gas separator performs liquid-gas separation regardless of the orientation of the liquid-gas separator.

* * * * *